INVENTOR
Alan J. Harris
BY Kenyon Palmer
Stewart & Estabrook
ATTORNEYS

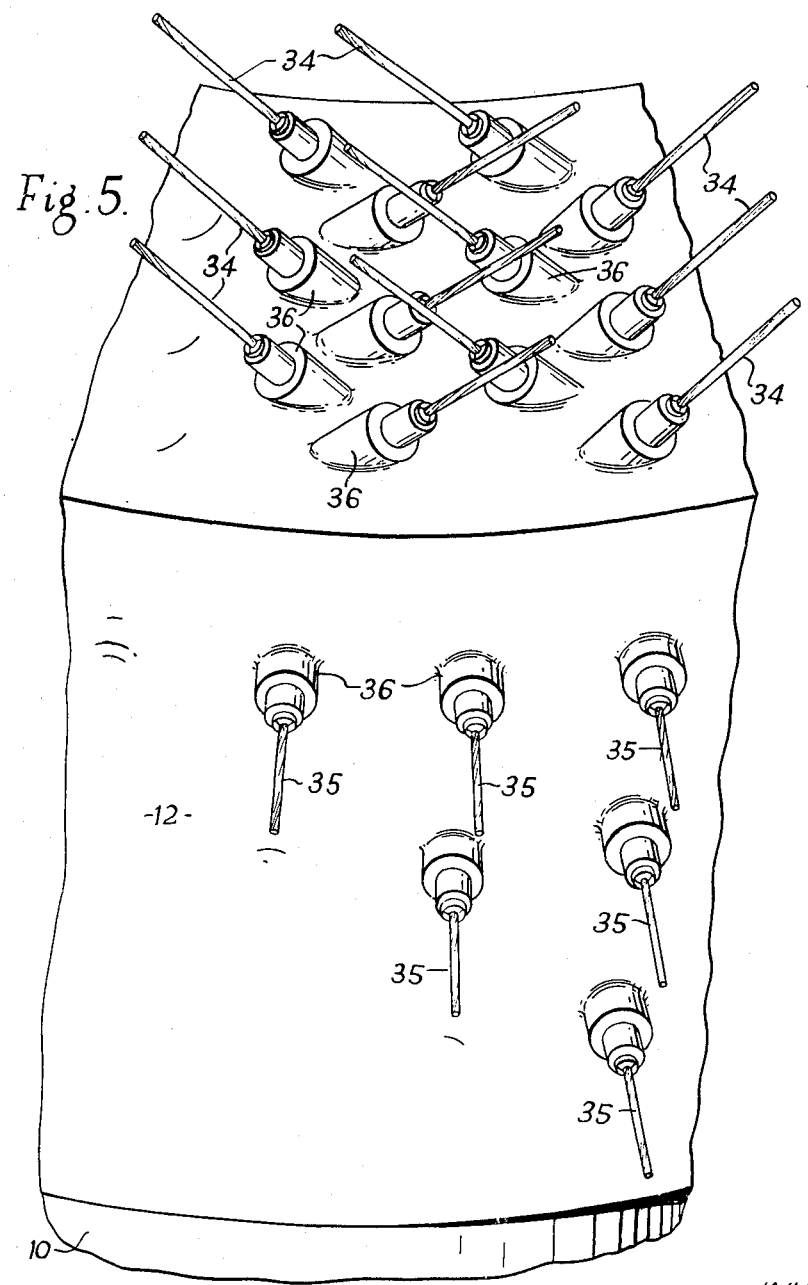

INVENTOR
Alan J. Harris
BY Kenyon Palmer
Stewart & Estabrook
ATTORNEYS

United States Patent Office 3,237,358
Patented Mar. 1, 1966

3,237,358
HIGH-PRESSURE STORAGE VESSEL CONSTRUCTED OF PRE-STRESSED CONCRETE
Alan James Harris, London, England, assignor to Sir Robert McAlpine & Sons Limited, London, England, a British company
Filed June 11, 1962, Ser. No. 201,484
Claims priority, application Great Britain, June 26, 1961, 23,044/61; Oct. 11, 1961, 36,551/61
4 Claims. (Cl. 52—224)

The present invention relates to a pressure vessel constructed of pre-stressed concrete.

The improved pressure vessels according to the invention may be used as storage vessels to contain gas, air or liquid at high pressure, or as a further specific example such vessels may constitute the main structural body part of a nuclear reactor structure.

It is a primary object of the invention to provide a form of pre-stressed concrete vessel offering the great strength necessary for adequate security as well as long life for the vessel.

The improved pressure vessel according to the invention comprises a monolithic body formed of a cylinder closed at both ends by slabs all of concrete, pre-stressed in part by an array of post-tensioned cables disposed within passages pre-formed in the concrete of the vessel, and passages conforming to parts of right and left hand helices or approximate helices about the axis of and over a part only of the circumference of the cylinder, the ends of the cables extending through the end slabs and the tensioned cables being anchored at both ends by anchorages located at the ends of the pressure vessel.

Further arrays of post-tensioned pre-stressing cables may be provided in the concrete end slabs of the vessel, these tensioned cables being disposed within pre-formed passages in the concrete of the end slabs and being anchored at both ends by anchorages located at side surfaces of the vessel near the ends thereof.

The passages pre-formed in the concrete for the reception of the cables are such that the cables are free therein at least until the post-tensioning and anchoring of the cables is effected and such passages may be formed by pre-shaped metal or other leakproof tubes located prior to the casting of the concrete in situ, though in some cases they may be formed by simple holes in the concrete produced with the aid of appropriately shaped and located cores which can be removed after the applied concrete has set.

In some cases as for example that of a pressure vessel forming the main structural body part of a nuclear reactor structure, the cables after tensioning and anchoring, remain free in the passages and the anchoring means is such that it may be disassembled or manipulated in such a manner as to permit individual cables to be re-tensioned or removed and replaced or renewed and re-tensioned.

In other cases the cables after tensioning and anchoring may be grouted up in the passages by the introduction of further concrete to fill the spaces around the cables in the passages.

The helical passages and cables in the concrete of the cylinder extend in both directions with similar helix angles about the axis of the vessel and they are usually arranged in a plurality of radial banks each comprising a number of passages and cables, the helical passages and cables of one direction being interlaced with the helical passages and cables of the other direction.

In the preferred arrangement the passages and cables are bowed outwards away from the axis of the cylinder and over at least a part of their length in the region of the center thereof or in other words they have a form as though wound about a barrel, so that when the helical cables are tensioned both axial and radial pre-stressing of the concrete is achieved. This barrel effect gives a favourable eccentricity or offsetting and in addition a reduction in the otherwise necessary thickness of the concrete in the cylindrical wall may be made possible.

Post-tensioning of the cables is effected by applying tensioning jacks at both ends of each cable, and the helical disposition of the passages with the cables free therein offers the advantage of low frictional resistance arising between a cable and the wall of its passage during the tensioning operation.

The helix angle of the helical passages and cables is determined so that individual cables extend part way only and usually less than half way around the circumference of the vessel and usually the helices terminate in the region of the junctions of the concrete cylinder and the concrete end slabs, and the end portions of the passages and cables are continued in substantially straight lines in planes approximately tangential to concentric circles in the wall of the vessel, and also inclined to the axis of the vessel.

A pressure vessel constructed as described above is well adapted to serve as the main structural body part of a nuclear reactor structure, such body part constituting a biological shield enclosing the reactor chamber containing the reactor core.

The invention is illustrated diagrammatically and by way of example in the accompanying drawings as applied to a nuclear reactor structure.

In the drawings,

FIG. 5 is a diagrammatic view in perspective showing a part of the top and a part of the side of the cast and set concrete vessel with the cables applied and tensioned.

Figure 1:
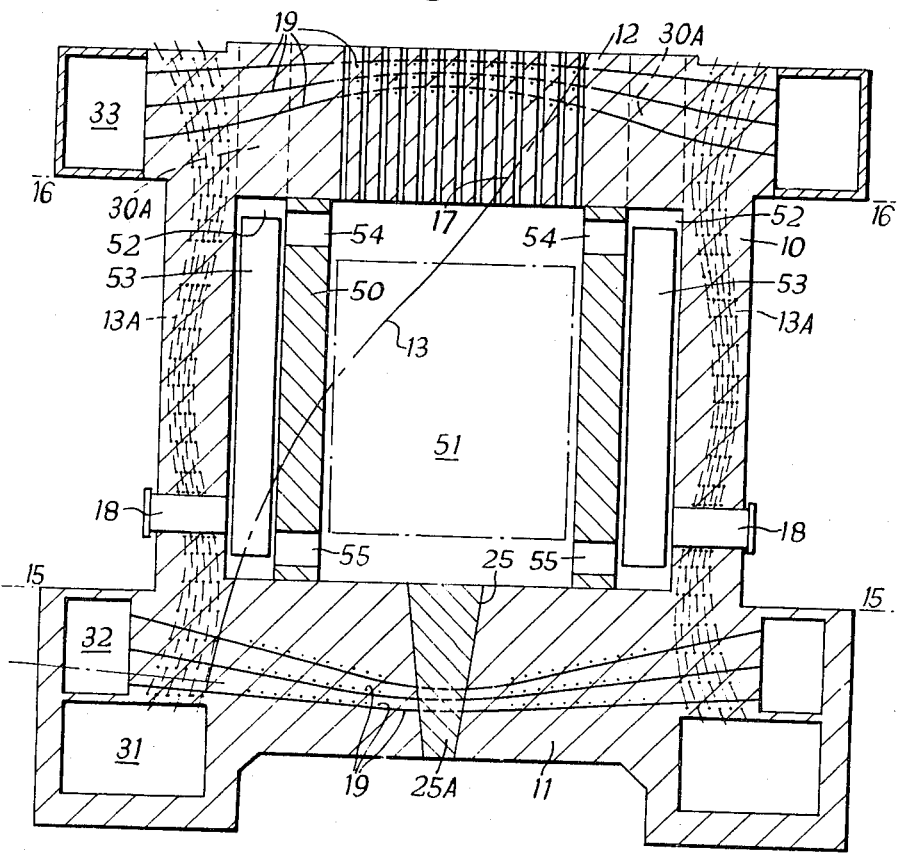
FIG. 1 is a view in sectional side elevation of a reactor structure constructed in accordance with the invention.

Referring to the drawings, the concrete pressure vessel constituting the main body part of the reactor structure shown comprises a vertical cylindrical part 10, a bottom end slab 11 and a top end slab 12.

In the construction of the vessel, internal shuttering (not shown) appropriate to the internal cylindrical form of the required vertical cylindrical part 10, is erected and outside this internal shuttering is mounted an array of metal tubes 13 of an internal diameter such as to permit free movement therein of prestressing cables of the size intended to be used.

Figure 2:
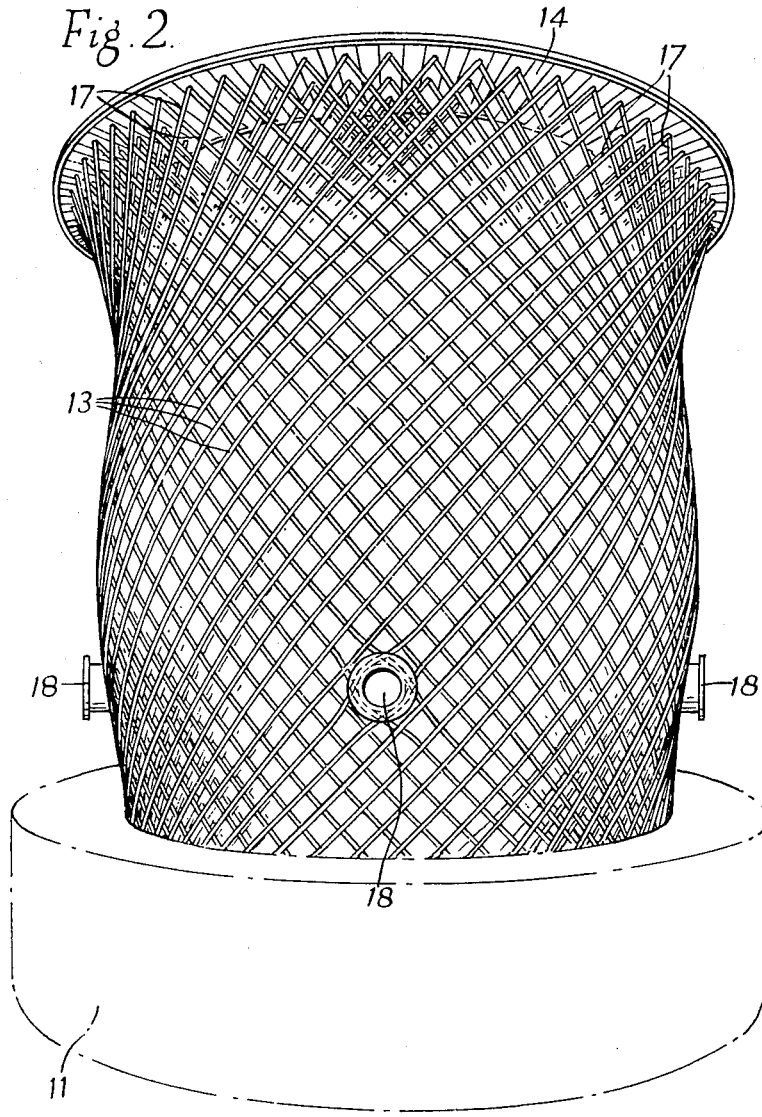
FIG. 2 is a view in side elevation showing an array of helical cable tubes as erected prior to erection of external shuttering and application of concrete to form the cylindrical part of the body of the vessel.

The metal tubes 13 of the array are bent and fixedly disposed so as to conform approximately to parts of similar helices about the internal shuttering, the array including right and left hand part helices crossing one another as shown clearly in FIG. 2.

The thickness of the wall of the concrete cylinder 10 of a nuclear reactor structure is large, thicknesses of the order of 15 ft. being contemplated and the tubes 13 are arranged in radial banks across the thickness of the concrete wall to be formed and with the tubes of opposite helical hand interlaced.

In FIG. 1 of the drawings interlaced radial banks of tubes with three tubes in each radial bank of one helical hand are shown by way of example, the outer chain lines of the groups of six chain lines marked 13A in FIG. 1 representing what may be described as the "envelope" of the tubes in that sectional elevation. The number of tubes in the banks may of course be varied.

The length of the tubes 13 and the helix angle are selected so that individual tubes extend part-way only and usually less than half-way around the circumference of the cylindrical wall to be formed, a typical example of a single tube being indicated at 13 in FIG. 1 as extending around approximately one third of the circumference. The helix angle may vary but an angle of 45° has been used and the shape of some of the individual tubes may diverge where necessary to provide for the passage of access pipes such as 18 required to extend through the wall of the constructed vessel. Such access pipes may be required for example between coolant circulators (not shown) mounted outside the vessel and communicating through such pipes with the interior of the vessel or they may be used to accommodate driving means for coolant circulators (not shown) mounted inside the vessel and driven from the exterior.

The tubes 13 in the case shown are held in position until the concrete is cast, by fixing their ends to supporting frames at the upper and lower ends of the internal shuttering, one such frame being shown at 14 at the upper end in FIG. 2.

In the preferred arrangement as shown the helical conformation of the tubes 13 terminates approximately at the lines of junction 15—15 and 16—16 of the cylinder 10 with the end slabs 11 and 12, and the upper and lower end portions 17 of the tubes 13 extend in substantially straight lines in planes approximately tangential to concentric circles in the cylindrical wall of the vessel to be formed and also at an inclination to the axis of the vessel. This arrangement permits of a maximum spacing of the ends of the tubes.

The helically disposed portions of the tubes 13 between the end slabs 11 and 12 are also bowed outwards away from the axis of the vessel, or in other words they have a form as shown in FIG. 2 as though the helices are wound upon the surface of a barrel of dimensions approximating to those of the cylindrical portion of the vessel to be formed and having a part of maximum dameter of from 5% to 15% greater than that of its ends.

Further arrays of tubes 19 for the reception of cables are disposed generally horizontally above and below the upper and lower ends of the cylinder so as to lie within the concrete of the upper and lower end slabs 11 and 12 when cast, with the ends of the tubes 19 open at the outer circumferential surfaces of the slabs.

These tubes 19 are arranged in groups of vertical banks containing a plurality, three in the case shown, of tubes one or more groups of banks of tubes 19 extending in a general direction at right angles to one or more other groups of banks of tubes and with the tubes of the different groups interlaced.

Figure 3:
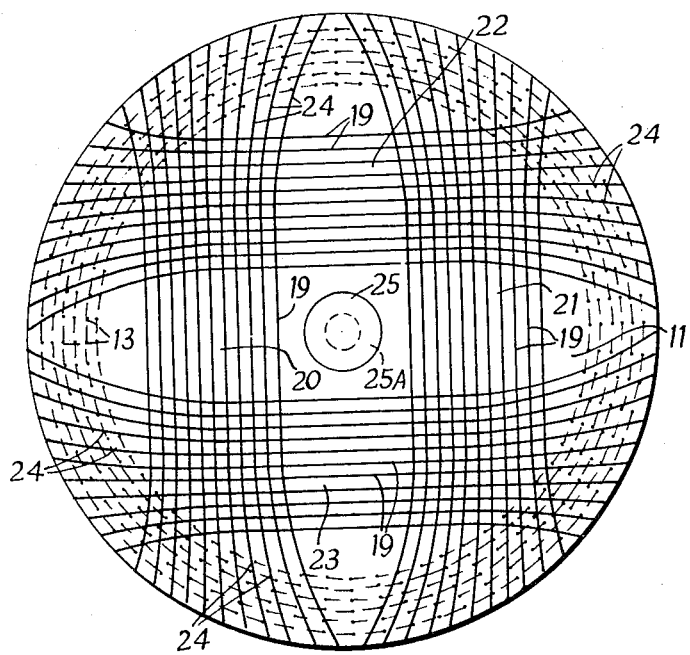
FIG. 3 is a diagrammatic plan view showing one construction of one end slab e.g. the bottom end slab of FIGS. 1 and 2.

FIG. 3 shows in plan one arrangement of tubes as applied for the construction of for example the bottom slab 11 of the structure.

In this case the transverse tubes 19 are arranged in two pairs of groups 20, 21, 22, 23, the groups 20, 21, of one pair crossing at approximate right angles with the groups 22, 23 of the other pair and with the tubes interlaced, the ends of the tubes being located so as to be accessible at the outer peripheral surface of the concrete slab 11 when cast.

The parts 24 of the tubes 19 adjacent their ends are bent as shown in FIG. 3 to provide substantially uniform spacing of the tube ends around the periphery of the slab 11.

The arrangement illustrated in FIG. 3 is particularly suitable for use in the case where the bottom slab 11 is to be provided with an aperture such as 25 for the removal of debris from within the vessel, it being understood that the aperture 25 is normally filled by a plug 25A (FIG. 1) closing and sealing the aperture.

Figure 4:
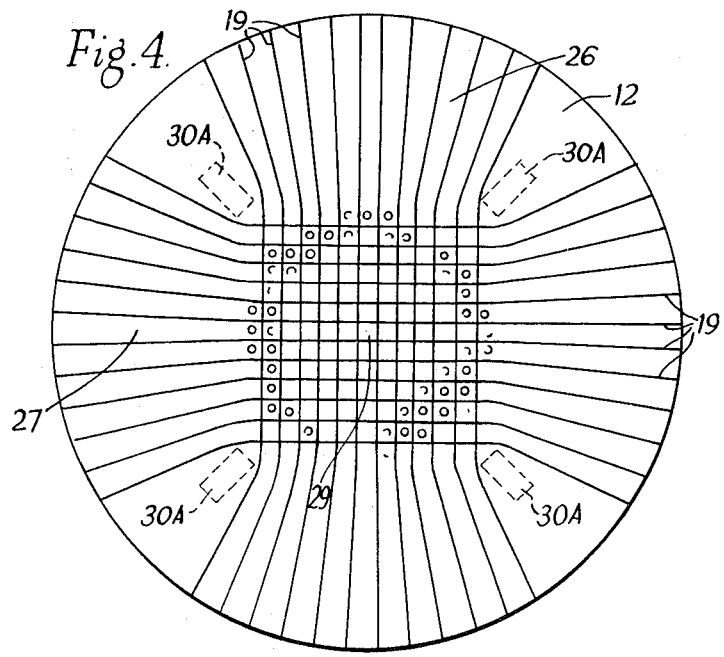
FIG. 4 is a diagrammatic plan view showing another construction of end slab e.g. the top end slab of FIGS. 1 and 2.

An alternative arrangement for an array of transverse tubes applicable for example to the upper slab 12, is shown diagrammatically in FIG. 4.

In this case two groups 26, 27 of banks of tubes 19 are disposed at approximate right angles with the tubes interlaced and in such a manner as to form a rectangular grid 29 in the central portion of the slab to be cast, the parts of the tubes outside said grid being bent through progressively increasing angles on opposite sides of diameters at the centres of the groups 26 and 27 so as to provide improved distribution of the ends of the tubes 19 about the periphery of the slab to be formed as well as to facilitate passage of the ends of the tubes 19 through the mesh formed by the ends 17 of the helical tubes 13 of the cylindrical part of the structure.

The paths of the tubes 19 in the top slab 12 in the case shown provide spaces between the tubes in the region of the centre of the slab for the formation of passages through the concrete for charge and control tubes and the like as shown at 30. Furthermore the disposition of the ends of the tubes is such as to provide spaces between the adjacent ends of different groups of tubes for the formation of passages through the concrete of the top slab such as are shown at 30A to permit insertion or removal of parts such as heat exchangers or boilers into or from the interior of the vessel.

With the arrays of tubes 13 and 19 mounted fixedly in position external shuttering is applied and concrete cast to form first the bottom slab 11 with the lower open ends of the helical tubes 13 at the underside of the slab 11 and the open ends of the lower transverse tubes 19 accessible at the outer periphery of the bottom slab.

With the aid of further progressively erected external shuttering further concrete is applied to embed the helical tubes 3 to form the cylindrical part 10 of the structure and finally in conjunction with further shuttering, concrete is applied to form the top slab 12 with the open upper ends of the helical tubes accessible at the upper surface of the top slab 12 and the open ends of the transverse tubes 19 in the top slab accessible at the outer peripheral surface of the top slab 12.

While in the mode of construction described above the helical tubes 13 comprise one-piece tubes extending between the ends of the vessel it is sometimes convenient to erect the tubes in sections representing part only of the length of the tubes. In such a case the lower tube sections are mounted in position around the lower end of internal shuttering and the concrete applied to form say the bottom slab 11 with the upper ends of the lower tube sections protruding from the concrete. Thereafter further tube sections are mounted in position with their lower ends in register with the protruding ends of the concrete-embedded first sections, the sections being mounted to conform to the required helical configuration and the external shuttering then lifted or further external shuttering erected and concrete applied, and this series of steps is repeated until at least the cylinder of the vessel is completed with the ends of the helical tubes extending upwards therefrom by a distance to extend through the thickness of the finally formed upper concrete slab 12 with the array of transverse tubes 19 therein.

Coupling members such as short sleeves of rubber may be used to hold the ends of the tube sections in register and prevent entry of concrete into the tubes.

In the case illustrated the upper and lower slabs 11 and 12 are formed with access galleries 31, 32 and 33, the walls of which are formed in part by the outer peripheral surfaces of the two slabs and the under side of the lower slab at which the open ends of the tubes 13 and 19 are located.

With the concrete set, lengths of cable 34 (FIG. 5) are introduced into each of the helical tubes 13 and lengths of cable 35 into the tranverse tubes 19, with their ends projecting at both ends of the tubes and the cables are tensioned from both ends with the aid of jacks and each end of each tensioned cable held by a demountable anchorage 36 in abutting engagement with, in the case of the cables 34 in the helical tubes 13, the upper and lower surfaces respectively of the top and bottom slabs 11 and 12 and in the case of the cables 35 in the transverse tubes 19 with the radially outer peripheral surfaces of the top and bottom slabs 11 and 12, see the part of the top slab 12 shown in FIG. 5.

With the helical arrangement of tubes and cables described extending in both directions but each over a part only of the circumferential length of the cylindrical part of the structure and tensioned from both ends, the frictional resistance arising between the cables 34 and helical tubes 13 is kept low and torsional forces are balanced. Furthermore the bowing or barrelling of the array of helical tubes 13 and cables 34 provides both axial and vertical pre-stressing of the concrete of the cylinder when the helical cables 34 are tensioned and this gives a favourable eccentricity or offsetting and may permit in addition a reduction in the otherwise necessary thickness of concrete in the cylinder wall.

With the arrangement described no special structural provision is necessary for housing the cable anchorages 36 and the anchorages are accessible at all times for re-tensioning or removal and replacement of individual cables.

The cables of steel may be of a conventional multi-strand type and various forms of anchorage devices may be used such as those embodying chucks with tapering or wedge-form clamping jaws.

Figure 8:
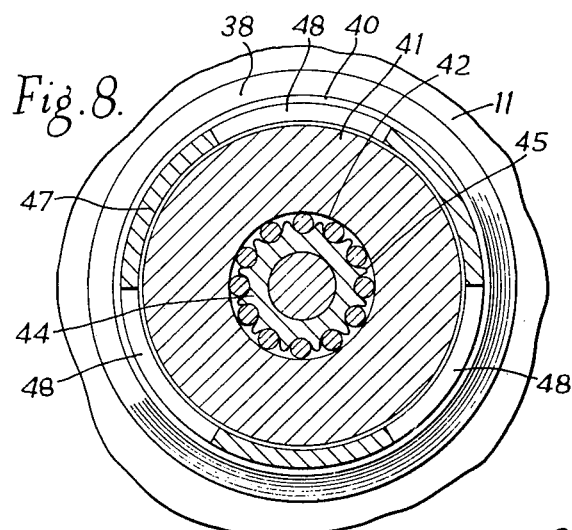
FIG. 8 is a sectional view taken on the lines VIII—VIII of FIG. 6.
Figure 6:
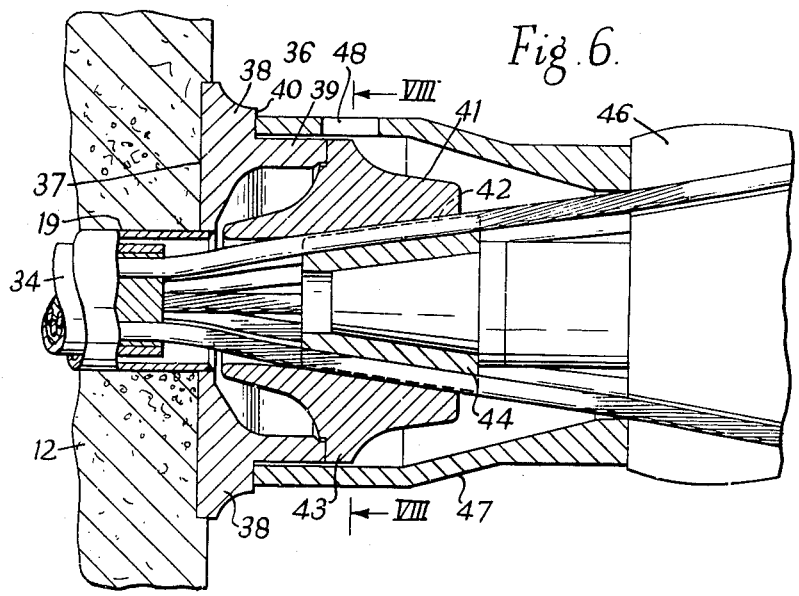
FIG. 6 is a view in sectional side elevation of a form of cable anchorage and a device for use therewith in re-tensioning a cable.
Figure 7:
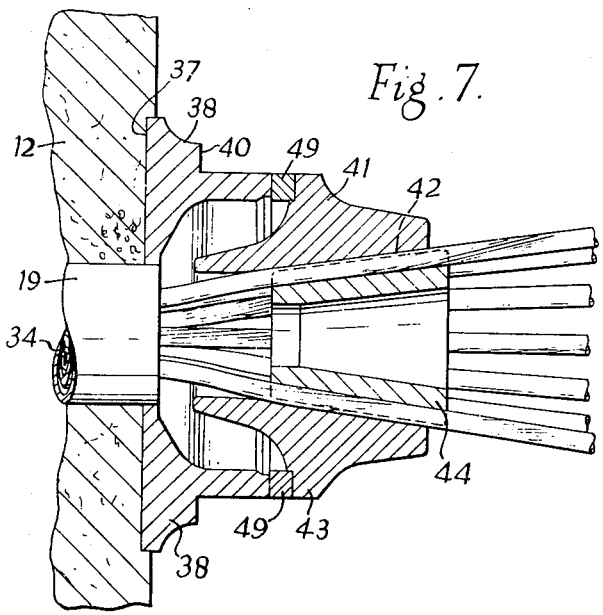
FIG. 7 is a view in sectional side elevation of the anchorage of FIG. 6 with the parts holding the cable in a re-tensioned condition.

An at present preferred form of anchorage 36 is shown in FIGS. 6, 7 and 8.

The anchorage here shown comprises a centrally apertured base member 37 having a bottom part 38 intended to make contact at its lower side with the concrete and having an upstanding annulus 39 of smaller external diameter than the bottom part 38 so as to present an external shoulder 40. A female clamping member 41 with a tapered aperture 42 therethrough is located with one of its ends inside the upstanding annulus 39 and is provided with an external flange 43 for abutting engagement with the free end of the annulus 39.

An apertured male clamping member 44 of an externally tapering form complementary to that of the aperture 42 in member 41 is provided on its exterior with axially directed flutes 45 (FIG. 8) of a size to receive but only partially envelop strands of cable end projecting from the end of a tube 13 or 19. It will readily be seen that the strands of the tensioned cable are gripped and clamped between the wall of the apertured member 41 and the flutes of the inner coned member 44.

To release an anchored end of a cable the tubular end of a jack of conventional form such as is shown at 46 in FIG. 6, is applied against the free end of the female member 41 and the jack operated to draw upon the strands of the cable.

Friction between the cable strands and the inner coned member 44 withdraws the coned member from the apertured member 41 and with the coned member 44 dislodged the cable is freed and the apertured member 41 if necessary drawn over the end of the cable so that the cable is then free to be removed from the tube 13 or 19. The cable may be replaced or a new cable substituted and tensioned by a similar operation to that described above, the inner coned member 44 however being thrust into the clamping position after the cable has been tensioned by the jack.

In some cases it is merely necessary to re-tension a cable still in position in its tube.

For this purpose a bridging stool is provided in the form of a sleeve 47 of a form to be applied at one end outside the clamping members 41 and 44 and over the upstanding annulus 39 on the base member 37 and into abutting engagement with the shoulder 40. The other end of said bridging stool 47 is of a size to be engaged by the tubular end of the jack 46.

The wall of the bridging stool 47 is provided with a number, three in the case illustrated, of circumferentially spaced holes 48 in a position to overlap the free end of the upstanding annulus 39 when the bridging stool is mounted on the cable anchorage.

In this case further tensioning of a cable by means of the jack takes place by reaction between the jack and the shoulder 40 so that the cable strands remain clamped between the female clamping member 41 and the coned male clamping member 44 and the external flange 43 on the female clamping member 41 moves with the cable and away from the free end of the upstanding annulus 39.

With the required tension achieved in the cable, shims 49 of appropriate thickness are inserted through the holes 48 in the wall of the bridging stool and into the space between the end of the upstanding annulus 39 and the external flange on the female clamping member 41, the shims being clamped in that position when the cable is released from the jack so that the required tension is maintained in the cable.

In the case illustrated an inner wall 50 of concrete or other material is constructed inside the main concrete cylinder 10 this inner wall 50 enclosing an inner space for the reactor core shown diagrammatically at 51 and constituting a further biological shield. The main cylindrical wall 10 and the inner wall 50 define the outer and inner boundaries of an annular space 52 shown as containing heat exchangers or boilers 53 connected with steam pipes (not shown) leading to the exterior, and the inner wall 50 is provided with upper and lower apertures 54, 55, permitting free circulation with the aid of circulators as previously referred to, of primary coolant between the inner reactor space and the annular space 52 and direct access of such coolant to the heat exchangers or boilers 53 and it will be seen that the access apertures 30A in the upper slab 12 are located over the upper end of the annular space 52 containing the heat exchangers or boilers 53.

As illustrated and described the end slabs 11 and 12 of the pressure vessel are flat slabs but in some cases one or both of the end slabs may be domed.

I claim:
1. A pressure vessel comprising:
    a monolithic pre-stressed concrete body including a hollow cylinder and end slabs closing the two ends thereof;
    a first plurality of separate passages extending from one axial end of said concrete body to the other and through the concrete of said hollow cylinder and of said end slabs, said first plurality of passages including a first group in which each passage conforms to a unidirectional part of an approximate helix of right hand about the axis of, and each passage extending about a part only of the circumference of, said concrete body, and a further group in which each passage conforms to a unidirectional part of an approximate helix of left hand about the axis of, and each extending about a part only of, the circumference of said concrete body and each crossing a plurality of the passages in the said first group;
    a network of cables one contained in each one of said first plurality of separate passages;
    anchors one on each end of each cable of said network in engagement with the concrete at the axially outer end surfaces of said end slabs and maintaining the cables under tension and the concrete of said body in compression;

a second plurality of separate passages in the concrete of one of said end slabs and a third plurality of separate passages in the concrete of the other of said end slabs, each of said second and third pluralities of separate passages including first groups and second groups extending through the concrete of the respective end slab with the passages of the first group extending transversely of the end slab and crossing a plurality of passages of the second group;

further networks of cables one contained in each one of the passages of said second plurality and said third plurality of separate passages;

anchors one on each end of each cable of said further networks in engagement with the circumferential surfaces of the concrete of the end slabs and maintaining the cables of said further networks under tension and the concrete of the end slabs in compression.

2. A pressure vessel as claimed in claim 1 wherein at least portions of the first plurality of separate passages within the concrete of the said hollow cylinder are bowed outwards away from the axis of the said concrete body.

3. A pressure vessel as claimed in claim 1 wherein the said separate passages of the said first plurality of separate passages are arranged in banks radially of the said concrete body with the passages of the said first group in said first plurality and the passages of the said further group in said first plurality interlaced.

4. A pressure vessel as claimed in claim 1 wherein the passages of the first plurality of separate passages include parts at each end extending through the concrete of the said end slabs in substantially straight lines in planes approximately tangential to circles lying in the wall of the said hollow cylinder and concentric therewith and said straight lines being at an inclination to the axis of the said concrete body.

References Cited by the Examiner

UNITED STATES PATENTS

| 2,425,079 | 8/1947 | Billig | 52—88 |
| 2,483,175 | 9/1949 | Billner | 52—224 |
| 2,655,846 | 10/1953 | Freyssinet | 52—230 |
| 3,084,481 | 4/1963 | Silberkuhl | 52—224 |
| 3,099,109 | 7/1963 | Hahn | 52—223 |

FOREIGN PATENTS

| 566,308 | 4/1958 | Belgium. |
| 625,378 | 8/1961 | Canada. |
| 630,591 | 10/1949 | Great Britain. |
| 572,667 | 2/1958 | Italy. |

FRANK L. ABBOTT, *Primary Examiner.*

HENRY C. SUTHERLAND, *Examiner.*